March 21, 1961   L. A. VISCOLOSI   2,975,469
EVISCERATING MACHINE

Filed May 25, 1959   3 Sheets-Sheet 1

INVENTOR.
LOUIS ANTHONY VISCOLOSI
BY
William Frederick Werner
ATTORNEY

March 21, 1961   L. A. VISCOLOSI   2,975,469
EVISCERATING MACHINE

Filed May 25, 1959   3 Sheets-Sheet 2

INVENTOR.
LOUIS ANTHONY VISCOLOSI
BY
William Frederick Werner
ATTORNEY

March 21, 1961

L. A. VISCOLOSI 2,975,469

EVISCERATING MACHINE

Filed May 25, 1959

INVENTOR.
LOUIS ANTHONY VISCOLOSI
BY
William Frederick Werner
ATTORNEY

United States Patent Office 2,975,469
Patented Mar. 21, 1961

2,975,469

EVISCERATING MACHINE

Louis Anthony Viscolosi, 88 Parnell St., Providence, R.I.

Filed May 25, 1959, Ser. No. 815,501

7 Claims. (Cl. 17—11)

This invention relates to means for cleaning poultry, such as chickens, turkeys, and the like, and it has particular reference to an instrument for removing the organs from inside the carcass of a fowl in an expeditious manner.

In the dressing of poultry for eventual retail sale, it is now generally recognized that it is desirable, from several aspects, to prepare the bird so that it is substantially ready to be cooked, with a minimum of effort on the part of the housewife who is the typical purchaser. This practice, of course, differs from that of not too many years ago, when the purchaser, usually had to remove the head and feet and the internal organs, and in some cases, the feathers as well. While the occasional cleaning of a single bird does not present too arduous a task, a different situation confronts the growers of large flocks of poultry, who habitually kill and dress many birds at one time.

There then remains the work of removing the insides from the carcass, and separating the edible from the waste portions. In the past, this labor has been mostly performed by hand, and when laborers are confronted with several hundred birds which must be cleaned quickly, the above noted occasional task becomes an onerous chore, so much so, that it is frequently difficult to find people who will accept, or continue long at, employment for this purpose. The fingers which are inserted in the carcass to remove the viscera become raw and lame, and there is too often a rupturing of organs which spill bad taste imparting body fluids on the flesh. Under the laws and regulations of some states, governing the sanitary and other conditions for commercial poultry raising, the carcass, after picking, should be maintained at substantially freezing temperature until the viscera are removed. This low temperature greatly adds to the discomfort of the worker.

A need has therefore existed for an inexpensive and reliable instrument or tool to replace manual evisceration. Such devices have been proposed and a number of years ago growers tested and experimented with a machine offered for this purpose, but with such disappointing results that they continued with the hand cleaning method. I have now devised an instrument which I find, from actual use, to be entirely satisfactory, and this specification will set forth the best embodiment thereof now known to me. By means of my invention, a worker can remove all the organs, including the lights, without physical discomfort, and at a much faster rate compared to hand cleaning, without undue fatigue. The entire contents are removed in one operation, and no problem is presented by unwanted rupturing.

Briefly explained, there is provided, among other things, a mounted projectible and retractable arm, which is moved through an incision in the abdominal wall of the carcass inwardly toward the neck. What I shall term a spoon or claw, for want of a better term, is connected to the advancing end of this arm and, as it contacts the breast bone and flesh, this claw automatically follows the contour of the carcass until, as the neck portion of the breast is reached, the claw is bent downwardly to grip the lights. When the arm is retracted, the claw simply pulls loose all of the contents and carries them out of the carcass, through the abdominal incision, as one mass. The claw may then be restored to its initial position for evisceration of another bird.

Referring to the drawings, wherein similar characters of reference refer to like parts:

Figure 1:
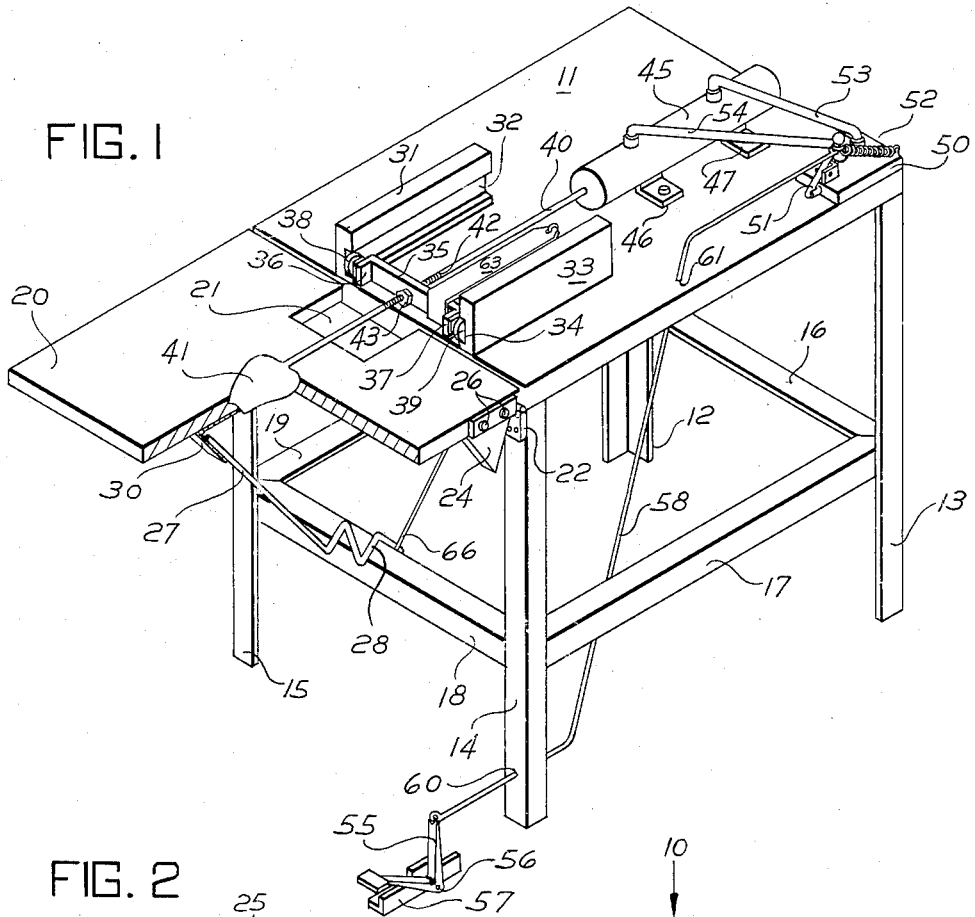
Figure 1 is a perspective view of the new and improved eviscerating machine showing the claw in extended position.
Figure 2:
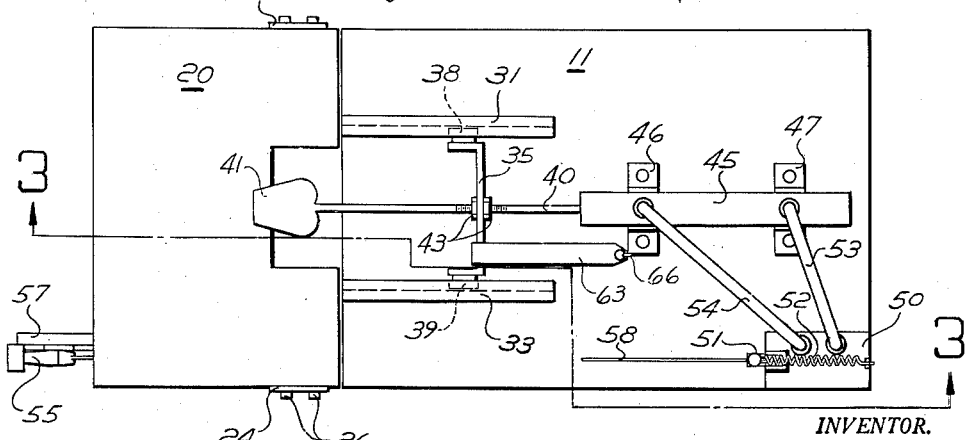
Figure 2 is a plan view of Figure 1 showing the claw in retracted position.
Figure 3:
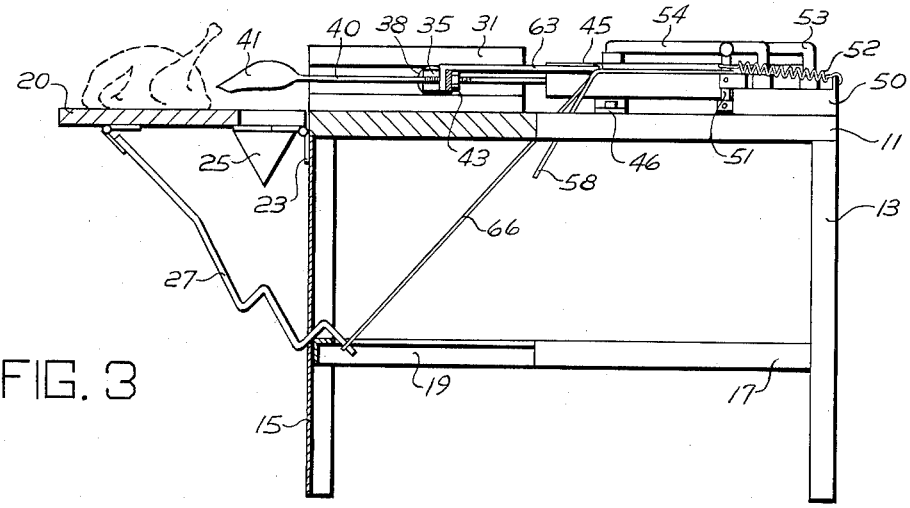
Figure 3 is a vertical sectional view taken along line 3—3 of Figure 2.

In proceeding with this invention, a table generally indicated by reference numeral 10 is provided with a top 11 and four legs 12, 13, 14 and 15 secured thereto. Four brackets 16, 17, 18 and 19 are provided. Bracket 16 is fastened to legs 12 and 13. Bracket 17 is fastened to legs 13, 14. Bracket 18 is fastened to legs 14, 15. Bracket 19 is fastened to legs 15 and 12.

A platform 20 having a cut out 21 is pivotally mounted to table 10 by means of hinges 22, 23. Platform stops in the form of triangular plates 24, 25 are secured to platform 20. Screws 26 securing triangular plate 24 to platform 20 can be seen in Figure 1. A platform lever 27 provided with a Z bend having a latch seat 28 is fixed on one end, as by welding to a hinge 30 secured to platform 20.

A left hand block 31 provided with a horizontal cam track 32 and a right hand block 33 provided with a horizontal cam track 34 are fixed in parallel relationship to top 11. A rod guide holder 35 U shaped to provide legs 36, 37 has a pair of cam track rollers 38, 39 rotatively mounted to legs 36, 37, respectively. Roller 38 rides in cam track 32. Roller 39 rides in cam track 34. A rod 40 provided on one end with a claw 41 is fixed to rod guide holder 35 by means of threads 42 and lock nuts 43. An air cylinder 45 is fixed to top 11 by means of legs 46, 47. Rod 40 is fixed to the piston in air cylinder 45. Air cylinder 45 is a "Modernaire" model #11–EBO–1508 manufactured by the Modernaire Corporation, San Leandro, California.

A two way valve 50, a "Modernaire" model #BV–410, is provided with a pivotally mounted control lever 51 held in one position by a spring 52 and connected to air cylinder 45 by means of conduits 53, 54.

A foot pedal 55 pivotally connected at 56 to a floor bracket 57 is connected to control lever 51 by means of a pull wire 58 guided in leg 14 at 60 and top 11 at 61.

An arm 63 secured to rod guide holder 35 is connected to the end of platform lever 27 by means of a pull wire 66.

Figure 4:
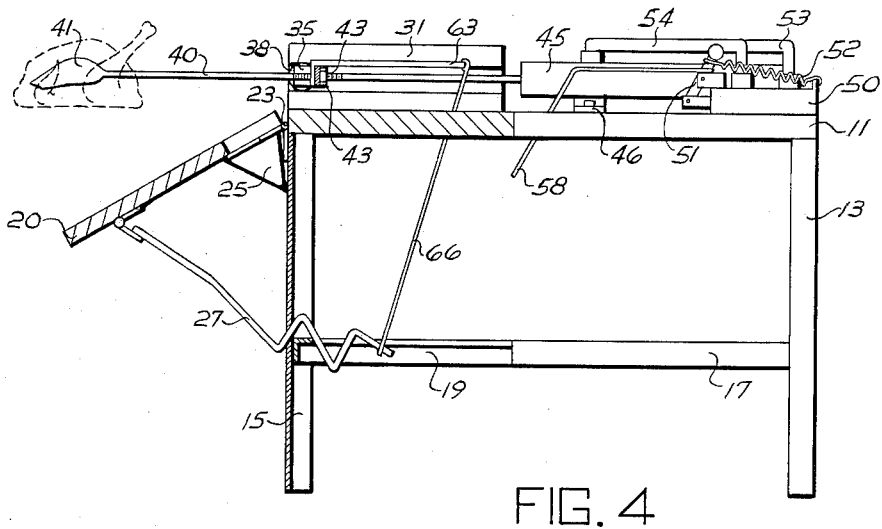
Figure 4 is a view similar to Figure 3 showing the platform in down position.
Figure 5:
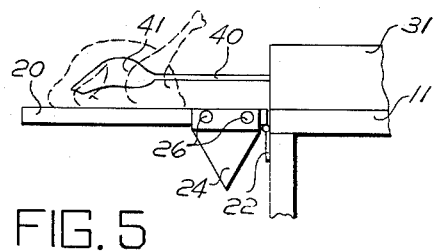
Figure 5 is a fragmentary side elevational view showing the platform in raised position.

In operation the carcass is slit. The platform 20 is positioned at an angle to the table 10. The rod 40 with the claw or spoon 41 attached is placed in extreme forward position. (See Figure 4.) The carcass through the slit is manually slid over the spoon. The carcass is pushed as far forward over the spoon 41 as the base of the breast bone of the carcass permits. The platform 20 is manually raised. (See Figure 5.) The latch 28 locks the platform 20 in horizontal position in relation to the table 10. The pedal 55 is depressed. The air valve cylinder 45 piston and rod 40 moves away from the carcass carrying the claw or spoon 41 and viscera, thus cleaning the carcass. The spoon 41 carries the viscera across the platform 20 to the orifice or cut out 21 in the platform 20 where the viscera drops into a receptacle for that purpose. Upon removing the operator's foot from the pedal 55, the spring 52 raises the pedal and actuates the air cylinder 45 to move the rod 40 and spoon 41 into forwardmost position. Rod guide holder 35 carrying arm 63 draws pull wire 66 as it moves to rearmost position and thereby lifts platform lever 27 to unlatch or move latch seat 28 away from bracket 18 to cause platform 20 to drop to a position whereby triangular plates 24, 25 abut legs 14, 15, respectively, and thereby place platform 20 in carcass receiving position.

Figure 6:
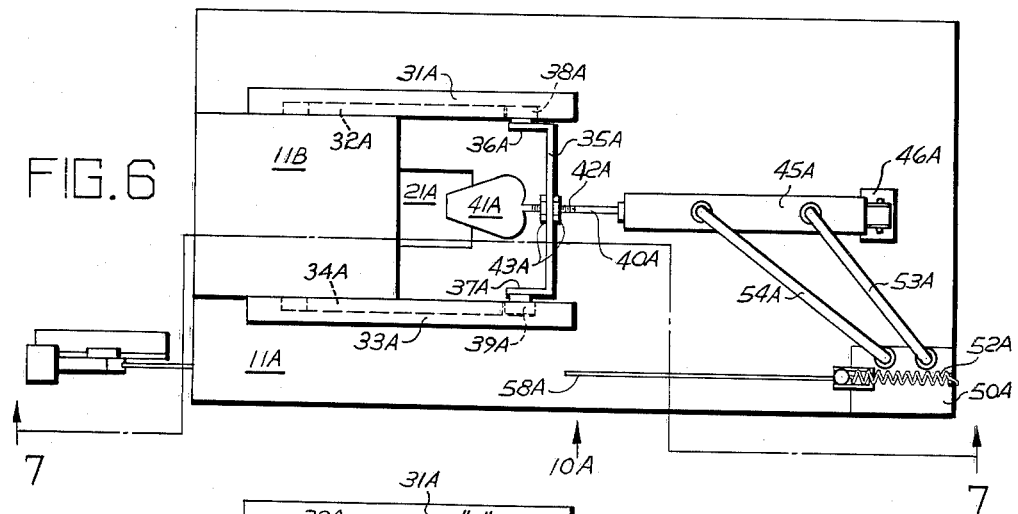
Figure 6 is a plan view of a modified form of eviscerating machine.
Figure 7:
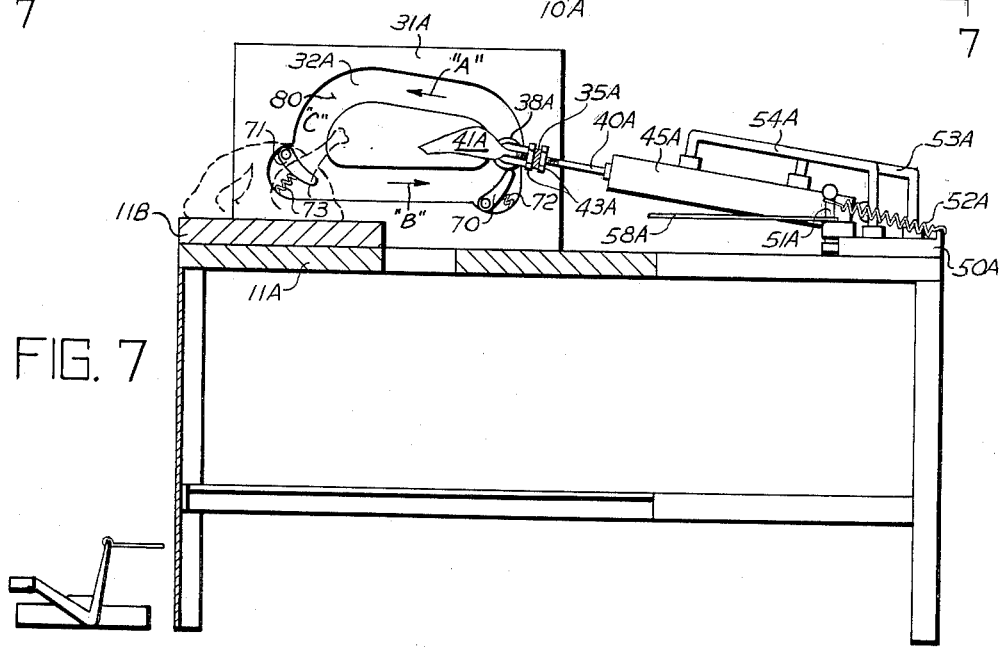
Figure 7 is a transverse view partly in cross section taken along line 7—7 of Figure 6.
Figure 8:
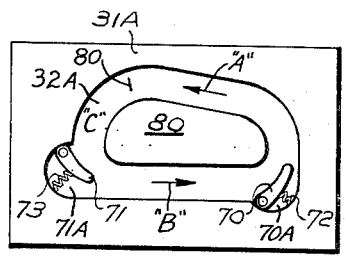
Figure 8 is a fragmentary side elevational view showing an enlarged detail of the cam.

Referring to Figures 6, 7 and 8 wherein is illustrated a modified form of eviscerating machine; a table 10A is provided with a top 11A having a raised portion 11B and an orifice or cut out 21A.

A left hand block 31A provided with a cam track 32A and a right hand block 33A provided with a cam track 34A are fixed in parallel relationship to top 11A. A rod guide holder 35A U shaped to provide legs 36A and 37A has a pair of cam track followers or rollers 38A, 39A rotatively mounted to legs 36A, 37A respectively. Roller 38A rides in came track 32A. Roller 39A rides in cam track 34A. A rod 40A provided on one end with a claw or spoon 41A is fixed to rod guide holder 35A by means of threads 42A and lock nuts 43A. An air cylinder 45A is pivotally mounted to a bracket 46A secured to top 11A. Rod 40A is fixed to the piston in air cylinder 45. Air cylinders 45, 45A are the same model with a modified mounting.

A two way valve 50A is provided with a pivotally mounted control lever 51A held in one position by a spring 52A and connected to air cylinder 45A by means of conduits 53A, 54A. Pull wire 58A is actuated by the same type foot pedal and previously described for pull wire 58.

Cam track 32A is provided with an "up" section, "forward" section, "down" section and "rear" section. In Figure 7 cam follower or roller 38A is located in the "up" section. Arrow "A" is located in the "forward" section. Arrow "B" is located in the "rear" section. The "down" section is indicated by reference character "C." Two depressions 70A and 71A are located in the contour of cam track 32A. Depression 70A is located at the intersection of "down" section "C" with "rear" section "B." Depression 71A is located at the intersection of "rear" section "B" and the "up" section. Two stop levers 70, 71 are pivotally mounted in depressions 70A, 71A, respectively. A spring 72 yieldingly positions stop lever 70 in cam track 32A. A spring 73 yieldingly positions stop lever 71 in cam track 32A. Stop levers 70, 71 are of a shape to conform to the contour of cam track 32A when they are in depressed position. As cam follower or roller 38A travels through a cycle of operation in the contour of cam track 32A in the direction of arrows "A" and "B," Figure 7, it causes stop levers 71, 70, to pivot against the tension of springs 73, 72 respectively and to form part of the contour of cam track 32A. However, as soon as cam follower 38A passes stop lever 71, spring 73 pivots stop lever 71 into the path of cam track 32A to prevent cam follower 38A from moving in a direction opposite to the direction of arrow "B." Similarly, just as soon as cam follower 38A passes stop lever 70, spring 72 pivots stop lever 70 into the path of cam track 32A to prevent cam follower 38A from moving in a direction opposite to the direction of arrow B. Cam follower 38A resting against stop lever 70 as shown in Figure 7 is in cycle starting position.

Stop lever 71 prevents cam follower or roller 38 from "backing up." Roller 38A will have a tendency to back up at this point because it is in this position of the cycle that the claw 41A starts to pull the lights out of the carcass. The air cylinder piston is changing direction from a forward motion to a rearward motion. The claw tends to hesitate due to the resistance of the lights from being separated from the carcass.

In operation the slit carcass is placed upon raised portion 11B. The foot pedal will manually be depressed to actuate pull wire 58A and therefore two way valve 50A to cause rod 40A to move rollers 38A, 39A through the path of cam tracks 32A, 34A, respectively. Cam tracks 32A and 34A are identical. Therefore, only one will be described to explain the cycle.

Claw 41A moves forward, in the direction of arrow "A," guided in the upper section of cam track 32A, from the starting position shown in Figure 7. As claw 41A continues to move forward, cam track 32A guides claw 41A downwardly, starting at point 80 in the cycle, so that claw 41A may enter the slit in the carcass and move forwardly. Roller 38A will engage lever 71, causing lever 71 to pivot against the tension of spring 73. As roller 38A passes lever 71, claw 41A starts to move rearwardly in the direction of arrow "B." This movement causes claw 41A to withdraw the lights out of the carcass. This action continues until roller 38A passes over lever 70 and reaches starting position. Thus the claw 41A has separated and drawn the lights out of the carcass and pulled them over cut out 21A where they fall into receptacle placed in position to catch them.

Having shown and described a preferred embodiment of the present invention, by way of example, it should be realized that structural changes could be made and other examples given without departing from either the spirit or scope of this invention.

What I claim is:

1. An eviscerating machine comprising a table, a left hand block provided with a cam track and a right hand block provided with a corresponding cam track, secured to said table in parallel relationship, a guide holder, cam followers secured in parallel relationship on opposite sides of said guide holder and adapted to respectively engage the cam tracks in said left hand block and right hand block, a rod provided with a claw on one end fixed to said guide holder, mechanism for reciprocating said rod back and forth across said table whereby said cam followers guided in said cam tracks move said claw through a cycle in a movement determined by said cam tracks.

2. An eviscerating machine comprising a table, a left hand block provided with a cam track and a right hand block provided with a corresponding cam track, said left and right hand blocks secured to said table in parallel relationship, a rod guide holder, two cam followers, one each secured on opposite sides of said guide holder and located respectively in the left and right hand block cam tracks, a rod, provided with a claw on one end, fixed to the medial section of said rod guide holder, an air cylinder fixed to said table and provided with a piston, said rod connected to said piston, a two way valve having a pivotally mounted control lever, fixed to said table, conduits connecting said two way valve to said air cylinder on opposite sides of said piston, a bracket and a manually operated pedal pivotally mounted to said bracket, a pull wire connecting said pedal to said control lever whereby in one position of said control lever said piston moves said claw forward and in another position of said control lever said piston moves said claw backward through a cycle of motion determined by said cam tracks.

3. An eviscerating machine comprising a table, a platform pivotally mounted to said table to position a carcass in one of two pre-selected positions in relation to said table, a platform lever pivotally mounted to said platform and provided with a latch seat for removably holding said platform in the first of said two pre-selected positions and in a horizontal plane with respect to said table, stop means positioning said platform in the second of said two pre-selected positions at an angle to said table upon release of said latch seat. a reciprocating pneumatic cylinder mechanism having a piston, a rod provided with a claw on one end secured to said piston, a left hand and a right hand block parallelly aligned and secured to said table, a rod guide holder fixed to said rod and provided with oppositely disposed cam followers, cooperating cam tracks in said left hand and right hand blocks, said cam followers respectively engaging said cooperating cam tracks, to be guided in said cooperating cam tracks upon reciprocating backward and forward movement of said rod, said rod and claw moving backward with said platform in first pre-selected position and moving forward with said platform in the second pre-selected position.

4. An eviscerating machine comprising a table, a left hand block provided with a cam track and a right hand block provided with a corresponding cam track, said left and right hand blocks secured to said table in parallel relationship, a rod guide holder, two cam followers, one each secured on opposite sides of said rod guide holder and located respectively in the left and right hand block cam tracks, a depression in said left hand cam track, a stop lever pivotally connected to said left hand block, located in said depression and provided with a contour which forms part of the contour of said cam track in one pivotal position, resilient means located in said depression yieldingly urging said stop lever into said cam track, said stop lever located in the normal starting position of the cycle of movement of the cam follower and positioned by the spring to block movement of said cam follower in one direction, a rod, provided with a claw on one end, fixed to the medial section of said rod guide holder, an air cylinder pivotally mounted on one end to said table and provided with a piston, said rod connected to said piston, a two way valve, having a pivotally mounted control lever, fixed to said table, conduits connecting said two way valve to said air cylinder on opposite sides of said piston, a bracket and a manually operated pedal pivotally mounted to said bracket, a pull wire connecting said pedal to said control lever, whereby in one position of said control lever said piston moves said claw forward and in another position of said control lever said piston moves said claw backward through a cycle of motion determined by said cam tracks.

5. An eviscerating machine comprising a table, a left hand block provided with a cam track, having an up section, a forward section, a down section, and a rearward section, a first depression and a second depression located in the coutour of said cam track, a first stop lever pivotally connected to said left hand block and located in said first depression and provided with a contour which forms part of the contour of said cam track in one pivotal position, resilient means yieldingly urging said first stop lever into said cam track to provide a cam follower stop in one direction of movement of a cam follower, at the starting up section of the cam track cycle, a second stop lever pivotally connected to said left hand block and located in said second depression and provided with a contour which forms part of the contour of said cam track in one pivotal position, resilient means yieldingly urging said second stop lever into said cam track to provide a cam follower stop in one direction of movement of a cam follower, at the point in the cam track cycle where the cam follower changes direction of movement from down section to the rear section, a right hand block provided with a corresponding cam track, said left and right hand blocks secured to said table in parallel relationship, a rod guide holder, two cam followers, one each secured on opposite sides of said rod guide holder and located respectively in the left and right hand block cam tracks, a rod, provided with a claw on one end, fixed to the medial section of said rod guide holder, an air cylinder pivotally mounted on one end to said table and provided with a piston, said rod connected to said piston, a two way valve, having a pivotally mounted control lever, fixed to said table, conduits connecting said two way valve to said air cylinder on opposite sides of said piston, whereby in one position of said control lever said piston moves said claw forward and in another position of said control lever said piston moves said claw backward through a path of movement determined by said cam tracks.

6. An eviscerating machine comprising a table, a platform pivotally mounted to said table, to be positioned in one of two pre-selected positions in relation to said table, a platform lever pivotally mounted to said platform and provided with a latch seat for removably holding said platform in the first of said two pre-selected positions and in a horizontal plane, stop means positioning said platform in the second of said two pre-selected positions and at an angle to said table upon release of said latch seat, an air cylinder fixed to said table and provided with a piston, said rod connected to said piston, a two way valve having a pivotally mounted control lever fixed to said table, conduits connecting said two way valve to said air cylinder on opposite sides of said piston, a rod provided with a claw on one end secured to said piston, a left hand and a right hand block parallelly aligned and secured to said table, a rod guide holder fixed to said rod and provided with oppositely disposed cam followers, cooperating parallel cam tracks in said left hand and right hand blocks, said cam followers respectively engaging said cooperating parallel cam tracks, and guided for movement in said cooperating parallel cam tracks upon reciprocating movement of said rod and a bracket fixed to said rod guide holder, a pull wire connected on one end to said bracket and on the other end to said platform lever whereby movement of said rod guide holder in one direction releases said latch seat to pivot said platform from said first to said second pre-selected position and in position for said claw to over lie said platform positioned at an angle to said table.

7. An eviscerating machine comprising a table, a rod, a claw connected to said rod, mechanism secured to said table for moving said claw backward and forward across said table, a platform pivotally mounted to said table to position a carcass in one of two pre-selected positions in relation to said table, and said claw, the first of said two pre-selected positions at an angle to said table, the second of said two pre-selected positions in a horizontal plane to said table, a catch for removably holding said platform in said second pre-selected position, stop means positioning said platform in the first of said pre-selected positions upon release of said catch, said claw in forward position entering said carcass with said platform in said first pre-selected position, said mechanism moving said claw backward across said table upon pivotal movement of said platform from first to second pre-selected position, whereby said claw engages the viscera in said carcass to withdraw viscera from said carcass.

References Cited in the file of this patent
UNITED STATES PATENTS
2,774,101    Ograbisz ---------------- Dec. 18, 1956